(12) United States Patent
Teserra et al.

(10) Patent No.: US 11,195,532 B2
(45) Date of Patent: Dec. 7, 2021

(54) HANDLING MULTIPLE INTENTS IN UTTERANCES

(71) Applicant: Oracle International Corporation, Redwood Shores, CA (US)

(72) Inventors: Saba Amsalu Teserra, Sunnyvale, CA (US); Vishal Vishnoi, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 76 days.

(21) Appl. No.: 16/857,789

(22) Filed: Apr. 24, 2020

(65) Prior Publication Data

US 2020/0342873 A1 Oct. 29, 2020

Related U.S. Application Data

(60) Provisional application No. 62/936,472, filed on Nov. 16, 2019, provisional application No. 62/936,471, filed on Nov. 16, 2019, provisional application No. 62/898,774, filed on Sep. 11, 2019, provisional application No. 62/898,790, filed on Sep. 11, 2019, (Continued)

(51) Int. Cl.
| | |
|---|---|
| *G10L 15/00* | (2013.01) |
| *G10L 15/26* | (2006.01) |
| *G10L 15/02* | (2006.01) |
| *H04L 12/58* | (2006.01) |
| *G06N 20/00* | (2019.01) |
| *G10L 15/22* | (2006.01) |

(52) U.S. Cl.
CPC ............. *G10L 15/26* (2013.01); *G06N 20/00* (2019.01); *G10L 15/02* (2013.01); *G10L 15/22* (2013.01); *H04L 51/02* (2013.01)

(58) Field of Classification Search
CPC .... G06F 40/211; G06F 40/263; G06F 40/284; G06F 40/295; G06F 40/30; G06F 40/35; G06N 20/00; G06N 5/041; G10L 15/02; G10L 15/22; G10L 15/26; H04L 51/02; H04L 51/18
USPC ......................................................... 704/235
See application file for complete search history.

(56) References Cited

U.S. PATENT DOCUMENTS

| | | | | |
|---|---|---|---|---|
| 5,754,978 A | * | 5/1998 | Perez-Mendez | ........ G10L 15/32 704/239 |
| 8,688,453 B1 | * | 4/2014 | Joshi | ....................... G06F 40/30 704/257 |

(Continued)

*Primary Examiner* — Khai N. Nguyen
(74) *Attorney, Agent, or Firm* — Kilpatrick Townsend & Stockton LLP

(57) ABSTRACT

The present disclosure relates to chatbot systems, and more particularly, to techniques for detecting that there are multiple intents represented in an utterance and then matching each detected intent to an intent associated with a chatbot in a chatbot system. In certain embodiments, a chatbot system receives an utterance from a user. A language of the utterance is determined and a set of rules identified for the language of the utterance. The utterance is parsed to extract information relating to the sentence structure of the utterance. The set of one or more rules is used to (1) determine whether the utterance is formed of two or more parts that each correspond to a separate intent of a user, and (2) split the utterance into the two or more parts for separate processing including matching of each user intent to an intent configured for a chatbot.

20 Claims, 11 Drawing Sheets

Related U.S. Application Data provisional application No. 62/839,580, filed on Apr. 26, 2019.

(56) References Cited

U.S. PATENT DOCUMENTS

| | | | | |
|---|---|---|---|---|
| 9,262,404 | B2* | 2/2016 | Ingram | G06F 11/3684 |
| 10,666,583 | B2* | 5/2020 | Yao | G06F 3/04817 |
| 10,783,879 | B2* | 9/2020 | Biyani | G06F 40/30 |
| 10,811,013 | B1* | 10/2020 | Secker-Walker | G10L 15/26 |
| 10,824,962 | B2* | 11/2020 | Singaraju | G06F 16/90332 |
| 11,011,160 | B1* | 5/2021 | Villaizan | G10L 15/187 |
| 2012/0089394 | A1* | 4/2012 | Teodosiu | G06F 40/30 704/235 |
| 2013/0185056 | A1* | 7/2013 | Ingram | G06F 40/40 704/9 |
| 2018/0365228 | A1* | 12/2018 | Galitsky | G06N 5/003 |
| 2019/0013017 | A1* | 1/2019 | Kang | G10L 15/14 |
| 2019/0066677 | A1* | 2/2019 | Jaygarl | G10L 15/26 |
| 2019/0259380 | A1* | 8/2019 | Biyani | G10L 15/19 |
| 2019/0294676 | A1* | 9/2019 | Sapugay | G10L 15/22 |
| 2019/0362712 | A1* | 11/2019 | Karpukhin | G10L 15/22 |
| 2020/0065384 | A1* | 2/2020 | Costello | G06N 3/0454 |
| 2020/0090034 | A1* | 3/2020 | Ramachandran | G10L 15/16 |
| 2020/0090638 | A1* | 3/2020 | Ugrani | G10L 15/1815 |
| 2020/0202845 | A1* | 6/2020 | Jacobson | G06F 40/30 |
| 2020/0251091 | A1* | 8/2020 | Zhao | G06N 3/08 |
| 2020/0265116 | A1* | 8/2020 | Chatterjee | G06F 17/16 |
| 2020/0342873 | A1* | 10/2020 | Teserra | G10L 15/22 |

\* cited by examiner

HANDLING MULTIPLE INTENTS IN UTTERANCES

CROSS-REFERENCES TO RELATED APPLICATIONS

The present application claims the benefit of and priority to U.S. Provisional Application No. 62/839,580 filed Apr. 26, 2019, entitled "ROUTING FOR CHATBOTS," the entire contents of which are incorporated herein by reference for all purposes.

The present application claims the benefit of and priority to U.S. Provisional Application No. 62/898,774, filed Sep. 11, 2019, titled "IDENTIFYING EXPLICIT INVOCATION OF BOTS," the entire contents of which are incorporated herein by reference for all purposes.

The present application claims the benefit of and priority to U.S. Provisional Application No. 62/898,790, filed Sep. 11, 2019, titled "HANDLING MULTIPLE INTENTS IN UTTERANCES," the entire contents of which are incorporated herein by reference for all purposes.

The present application claims the benefit of and priority to U.S. Provisional Application No. 62/936,472, filed Nov. 16, 2019, titled "HANDLING EXPLICIT INVOCATION OF CHATBOTS," the entire contents of which are incorporated herein by reference for all purposes.

The present application claims the benefit of and priority to U.S. Provisional Application No. 62/936,471, filed Nov. 16, 2019, titled "HANDLING MULTIPLE INTENTS IN UTTERANCES," the entire contents of which are incorporated herein by reference for all purposes.

The entire contents of the following application, filed concurrently with the present application, are also incorporated herein by reference for all purposes.

U.S. Non-Provisional application Ser. No. 16/857,772, filed Apr. 24, 2020, titled "HANDLING EXPLICIT INVOCATION OF CHATBOTS.".

TECHNICAL FIELD

The present disclosure relates to chatbot systems, and more particularly, to techniques for detecting that there are multiple intents represented in an utterance and then matching each detected intent to an intent associated with a chatbot in a chatbot system.

BACKGROUND

Chatbots provide an interface for conversations with human users. Chatbots can be configured to perform various tasks in response to user input provided during a conversation. The user input can be supplied in various forms including, for example, audio input and text input. Thus, natural language understanding (NLU), speech-to-text, and other linguistic processing techniques may be employed as part of the processing performed by a chatbot. In some computing environments, multiple chatbots are available for conversing with a user, with each chatbot handling a different set of tasks.

One of the challenges to implementing a chatbot system is determining when to permit a chatbot to handle a particular piece of user input (e.g., a text utterance). In some instances, a user may provide input that expresses more than one user intent. For instance, the user may intend for multiple tasks to be performed, and there may be different chatbots configured to perform those tasks.

BRIEF SUMMARY

The present disclosure relates to chatbot systems, and more particularly, to techniques for detecting that there are multiple intents represented in an utterance and then matching each detected intent to an intent associated with a chatbot in a chatbot system. Various embodiments are described herein, including methods, systems, non-transitory computer-readable storage media storing programs, code, or instructions executable by one or more processors, and the like.

An important but challenging functionality for chatbots is the ability to identify potentially multiple intents that could be posed by the user in one or more utterances. For example, when customers communicate with the chatbots of service providers using utterances, it is not always the case that the customers have only one intent in mind. They can have more, and when they do not have more they could also be adding some explanations or background information to the intent they have at the moment. In the broader sense this could range from a paragraph long statement or several sentences to a single sentence (complete sentence or fragment) with one or more intents.

In certain embodiments, a chatbot system receives an utterance. A language of the utterance is determined. A set of rules is then identified for the language of the utterance. The utterance is parsed to extract parts of speech and other information relating to the sentence structure of the utterance. The set of rules can include rules for different sentence structures, for example, different types of sentences such as simple, compound, complex, or compound-complex sentences. One or more rules from the set of rules that are applicable to the utterance (e.g., rules appropriate for the type of sentence in the utterance) are then applied to determine whether the utterance is formed of two or more parts that each correspond to a separate intent of a user. For example, in some instances, the two of more parts may include conjuncts joined by a coordinating conjunction. In this manner, it can be determined that a given utterance represents multiple intents. Following identification of the two or more parts, the utterance is split to form a separate sentence for each part of the two or more parts. The set of rules includes rules for determining how to construct these new sentences depending on the structure of the utterance. Each newly formed sentence can then be processed as a stand-alone utterance to determine whether the intent of the stand-alone utterance matches an intent associated with a bot. Additionally, each newly formed sentence can also be analyzed to determine if there are still multiple intents remaining within the newly formed sentence. Thus, detection of multiple intents can be repeated, e.g., in a recursive fashion, to detect nested intents.

Another important but challenging functionality for chatbots is the ability to determine when a user is trying to invoke a chatbot and, further, to determine what input to provide to the chatbot being invoked. In particular, it is important to be able to determine (1) that an utterance supplied by a user specifically identifies the chatbot to be used, and (2) which parts of the utterance should be passed onto the chatbot for processing.

In certain embodiments, an utterance is processed to determine whether the utterance includes an invocation name that identifies a particular chatbot in a chatbot system. If the utterance includes an invocation name, then the utterance is deemed to explicitly invoke the corresponding chatbot. Additionally, the utterance is processed to determine which parts of the utterance to provide, if any, as input to the explicitly invoked chatbot. The input to the chatbot includes a portion of the utterance not associated with the invocation itself and may correspond to a user intent. For example, the utterance "Order pizza using Pizza Bot" could be analyzed to generate "Order pizza" as an input string to a chatbot that has been assigned the name "Pizza Bot." Upon being invoked, the chatbot processes its received input, if any, to try to match the input to an intent among a set of one or more intents that have been configured for the chatbot. For example, the chatbot may have been configured with an intent for ordering pizza, where the intent has associated with it a dialog flow for starting a conversation relating to ordering pizza.

In certain embodiments, detecting multiple intents in an utterance and splitting of the utterance into two or more utterances, one for each detected intent, is performed by a master bot or digital assistant in a chatbot system. For each utterance of the two or more utterances formed as a result of the splitting, the master bot or digital assistant then performs an explicit invocation analysis to determine whether any of these utterances is an explicit invocation of a particular chatbot (e.g., a child bot). If so, the master bot or digital assistant invokes the particular chatbot. If there is no explicit invocation, then the master bot or digital assistant may perform intent classification using a pre-trained classifier to determine which chatbot to use for handling a particular utterance of the two or more utterances. The intent classification leads to an implicit invocation of the determined chatbot. The master bot or digital assistant then routes the particular utterance to the implicitly invoked chatbot, which can include its own pre-trained classifier for determining whether the particular utterance matches to an intent configured for the chatbot.

In certain embodiments, a chatbot is configured to determine, upon receiving a new utterance during an existing conversation with a user, that the utterance includes multiple intents, then split the utterance into two or more utterances, one for each determined intent. Following the splitting, the chatbot can apply its pre-trained classifier to determine whether the chatbot should handle any of the two or more utterances. If the chatbot determines that it cannot handle a particular utterance, e.g., because the utterance is not a sufficient match to any intent associated with the chatbot, then the chatbot may refer the utterance to a master bot or digital assistant for handling. The handling of the utterance by the master bot or digital assistant may involve routing to a different chatbot.

In certain embodiments, a computer system with at least one chatbot is configured to perform a method involving receiving an utterance comprising text that forms at least a sentence fragment. The method further involves parsing the utterance to produce information on a sentence structure of the utterance, and identifying one or more rules that are applicable to the sentence structure of the utterance. The method further involves detecting, using the one or more rules, that the utterance comprises two or more parts which represent separate user intents, and then splitting the utterance into the two or more parts. The method further involves analyzing the two or more parts separately. The analyzing comprises identifying a first chatbot for handling a first part of the two or more parts. The first part is then communicated to the first chatbot for handling.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are various techniques for processing an utterance from a user to, among other things, (1) determine whether the utterance represents multiple intents and (2) refine the utterance for further processing including, for example, processing to determine whether an intent in the utterance matches an intent that has been configured for a particular bot.

Also described herein are various techniques for identifying an explicit invocation of a chatbot and determining an input for the chatbot being invoked. In certain embodiments, explicit invocation analysis is performed by a master bot or digital assistant based on detecting an invocation name in an utterance. In response to detection of the invocation name, the utterance is refined for input to a chatbot associated with the invocation name. Refining of an utterance in connection with explicit invocation may involve determining which parts of the utterance, if any, contain relevant information for the chatbot and generating a new utterance, using the relevant parts of the utterance, for processing by the chatbot.

As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." Bot intents are described in further detail in the next section below.

Chatbot System Overview (Example)

Figure 1:
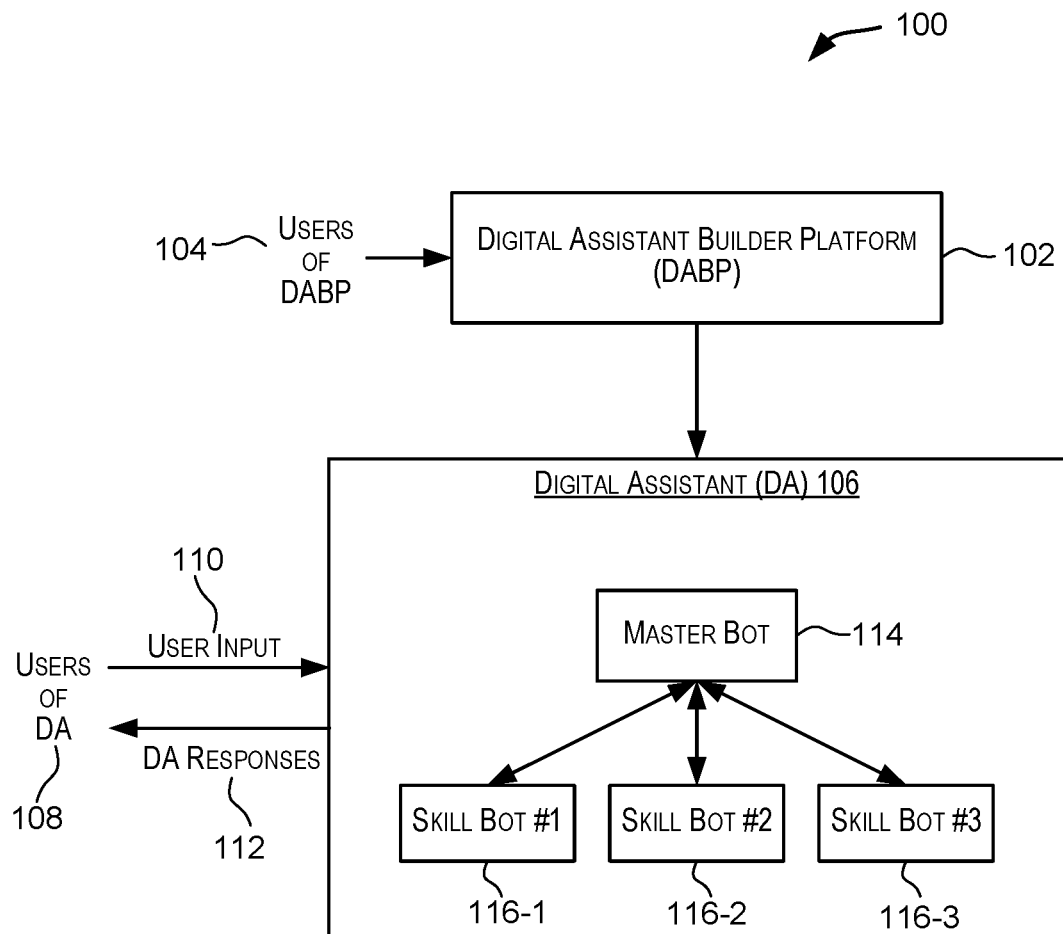
FIG. 1 is a simplified block diagram of a distributed environment incorporating an exemplary embodiment.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the Exit and Help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as an explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Explicit Invocation and Multiple Intents

Figure 2:
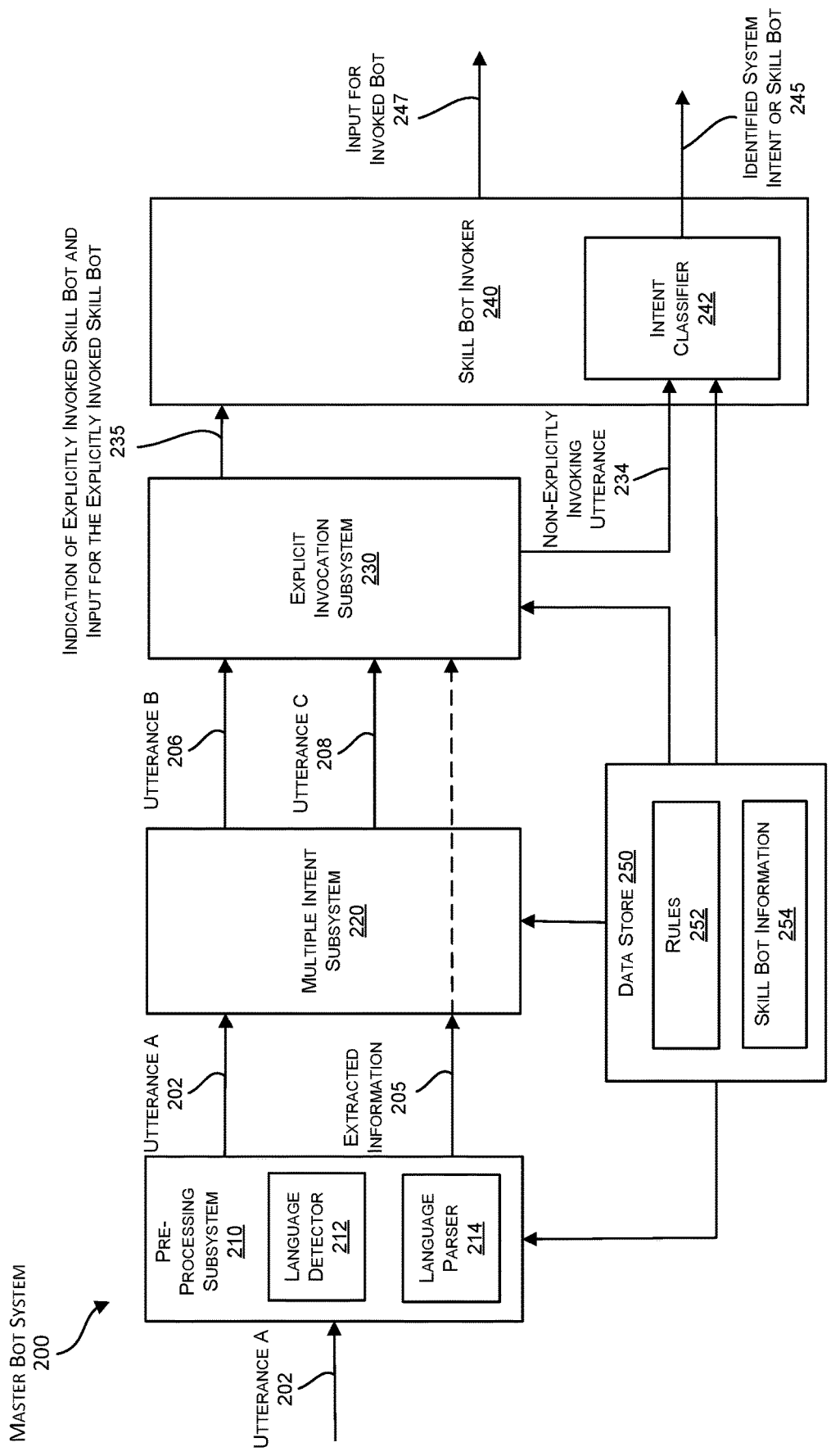
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. If the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
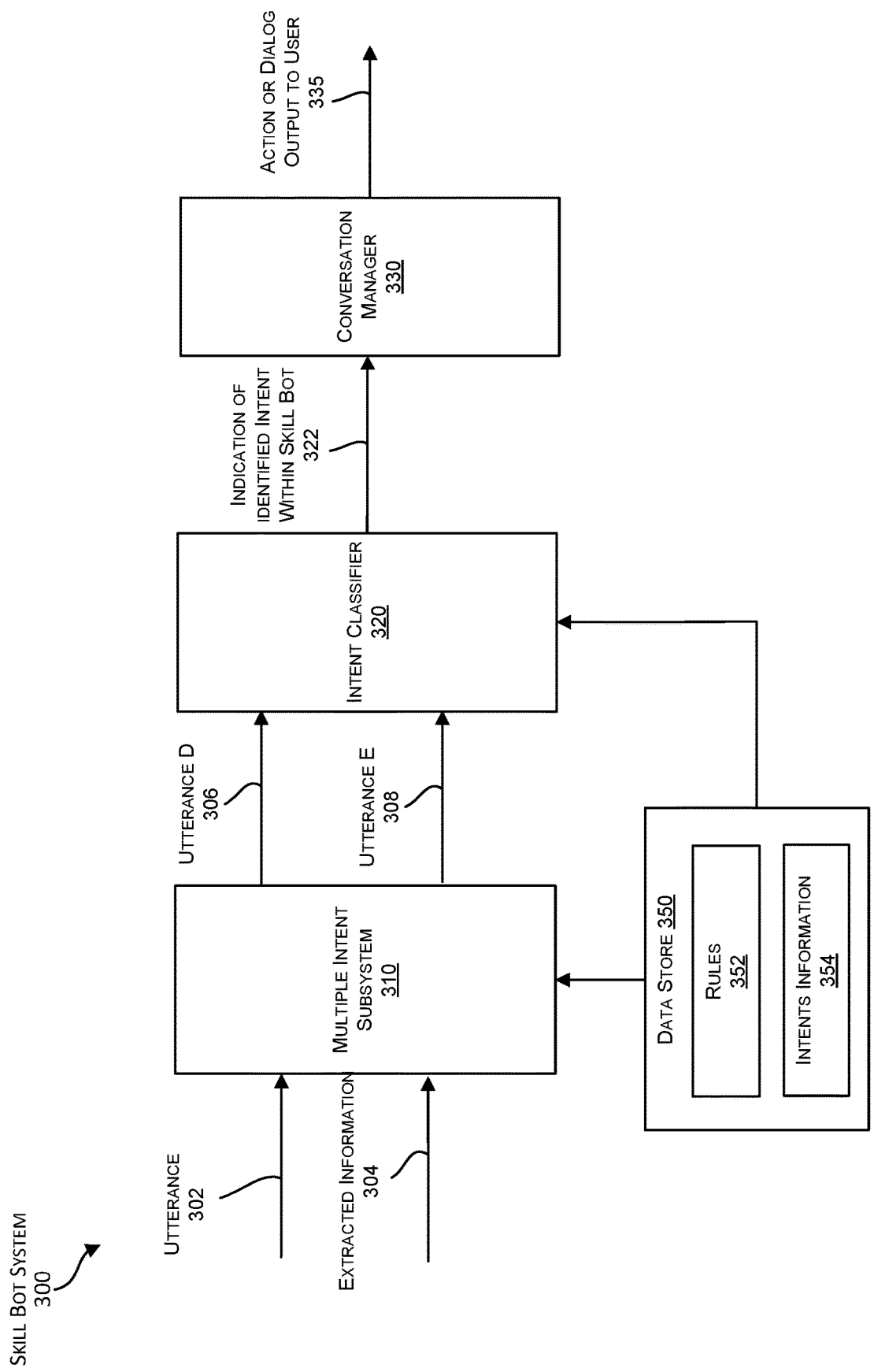
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., Help, Exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

Although depicted as a single block, the intent classifier 242 can be implemented using a combination of separately trained classifiers. For example, in some embodiments, the intent classifier 242 may use a system intent model and a skill bot model (also referred to as a candidate skills model). The system intent model can be generated based on training using utterances representative of system intents. Similarly, the skill bot model can be generated based on training using utterances representative of skill bots.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2. For instance, in certain embodiments, the intent classifier 320 is implemented using a machine-learning model. The machine-learning model of the intent classifier 320 is trained for a particular skill bot, using at least a subset of example utterances associated with that particular skill bot (e.g., utterances representative of intents that have been configured for the particular skill bot) as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Figure 4:
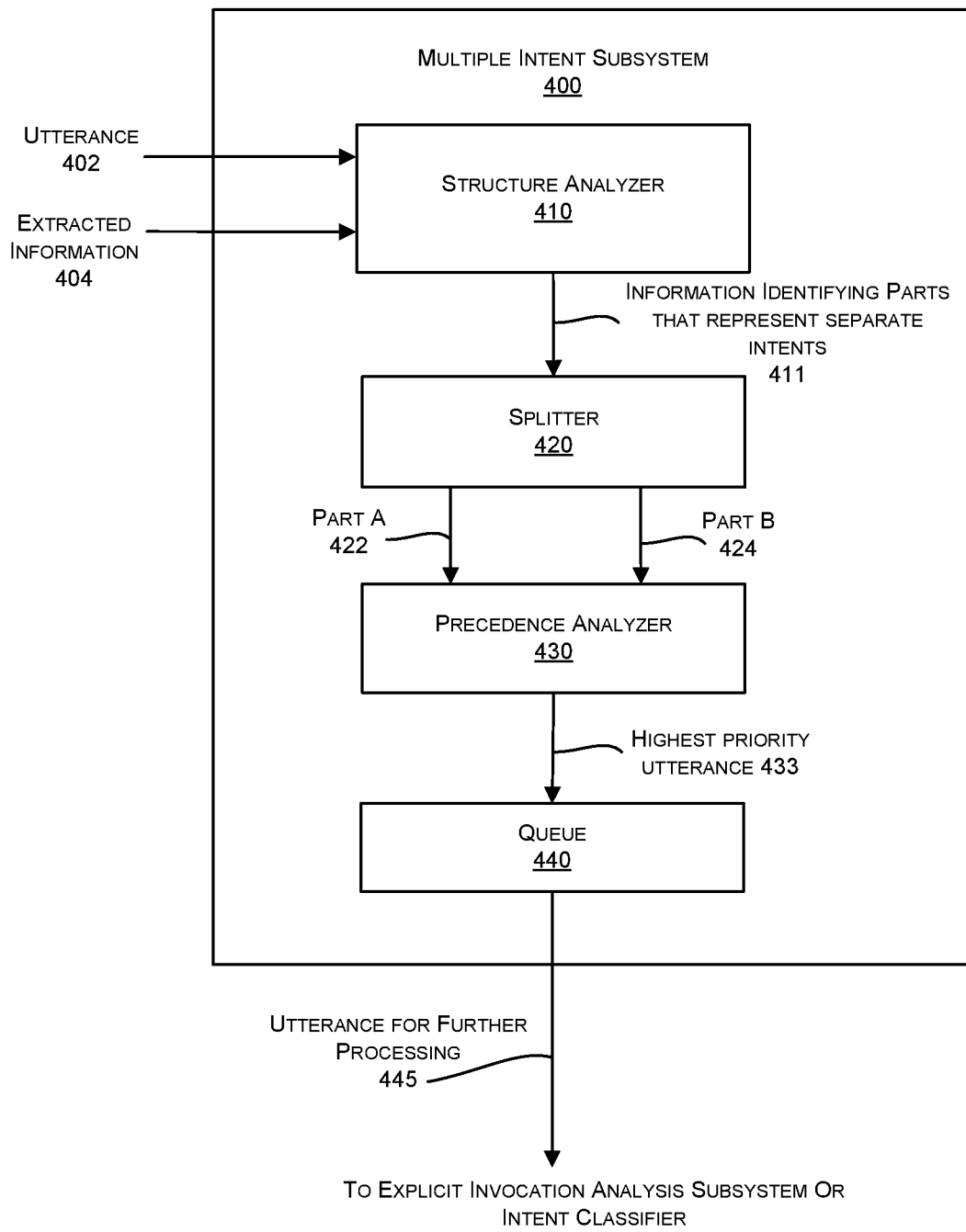
FIG. 4 depicts a multiple intent subsystem according to certain embodiments.

FIG. 4 depicts an MIS 400 according to certain embodiments. The MIS 400 can be used to implement an MIS in a master bot (e.g., MIS 220) or an MIS in a skill bot (e.g., MIS 310). As depicted in FIG. 4, the MIS 400 includes a structure analyzer 410, a splitter 420, a precedence analyzer 430, and a queue 440. FIG. 4 is merely an example. Although depicted as separate, the various components of the MIS 400 can be combined with each other or arranged other ways.

Structure analyzer 410, also referred to herein as a statement processor, receives an utterance 402 together with extracted information 404 generated for the utterance 402 by a language parser. As indicated above, extracted information can include POS tags, tokens, and other grammatical features, in addition to dependency information indicating relationships between the linguistic units (e.g., individual words) in an utterance. Given a language's complexity, there are several ways in which an utterance provided by a user articulates one or more intents. In certain embodiments, the structure analyzer 410 executes program logic to identify different scenarios under which multiple intents may be articulated by utterance 402. The structure analyzer 410 analyzes the sentence structure of the utterance, based upon language-specific constructs and usage, to determine whether the structure fits a sentence pattern associated with that of an utterance representing multiple intents. Structure analyzer 410 may apply a different pattern depending on the type of sentence in the utterance 402. For instance, the pattern for a simple sentence may differ from that of a compound sentence or a complex sentence.

For example, an utterance comprising a sentence such as:
"I want to order pizza and coke"
may be processed and determined to include two parts, each part representing a separate intent. The first part, "I want to order pizza" is a conjunct linked to the second part, "coke" through the coordination word "and". The two conjuncts may specify two separate intents: to order pizza and to order coke. However, as indicated above, the processing performed by an MIS does not involve resolving an intent in an utterance to a bot intent. Although the structure analyzer 410 can detect that multiple intents are being articulated by the utterance 402 and arrive at a generic understanding of the utterance 402, the structure analyzer 410 does not attempt to identify the exact meaning of any of the detected intents.

Instead, the MIS 400 separates the utterance 402 into two or more parts. For instance, in the example above, the utterance can be separated into:
"I want to order pizza" and "I want to order coke".
In this example, the second part of the utterance is a fragment that is transformed into a complete sentence by replicating "I want to order" from the first part of the utterance. Separation of the utterance 402 into two or more parts is performed by the splitter 420 and using the results of the analysis performed by structure analyzer 410. The results of this analysis may include information 411 that identifies parts of the utterance 402 that represent separate intents.

As another example, a compound sentence such as:
"Malls are great places to shop; I can find everything I need under one roof"
may be processed and determined to identify two parts ("Malls are great places to shop," and "I can find everything I need under one roof") that relate to two separate intents. In this example, since each part is an independent clause that can stand on its own, no additional work is needed for splitting the utterance beyond separating the two parts from each other and, optionally, adding a period at the end of each part.

Splitter 420 constructs a separate utterance (e.g., a part "A" 422 and a part "B" 424) for each intent when the results of the processing performed by the structure analyzer 410 indicate that there are multiple intents represented in the utterance 402. In certain embodiments, the splitter 420 is configured to split the utterance 402 into atomic sentences. The manner in which an utterance is split depends on the sentence structure of the utterance. Thus, in addition to different patterns, different rules for splitting an utterance can be applied depending on sentence type.

Splitting operates to refine the original utterance for ease of processing by enabling the intents to be handled one at a time, by the same bot or by different bots. Any further linguistic analysis, e.g., entity, task, or sentiment detection, can be performed without ambiguity on each of the two or more parts. This is similar to how a human agent would handle intents in order to avoid confusion that would result from, for example, the human agent expecting to receive information in a certain order and the user providing the information in a different order. An exception to the separate handling of utterances resulting from a split is when there is an interdependence between intents. Interdependence can be determined as part of the linguistic analysis performed by an MIS.

Splitting is not always straightforward and usually involves more than simply dividing an utterance into two or more parts comprising linguistic units in the same order as the linguistic units appear in the utterance. For instance, as illustrated by the "I want to order pizza and coke" example above, in some cases a portion of an utterance should be replicated for inclusion in a newly formed utterance. Splitting can involve determining which portions to replicate, which portions to omit, and/or which word or words mark the boundary between two intents.

In some instances, the part of an utterance identified as representing or articulating an intent is a conjunct. A conjunct is a word, a phrase, or a clause that is linked to another word, phrase, or a clause, through coordination. There are different ways in which two or more conjuncts may be conjoined: examples include by using different kinds of conjunctions such as a coordinating conjunction (e.g., and, but, for, or, nor, so, yet), using a subordinating conjunction (e.g., used to connect a dependent clause to a sentence), a paired/correlative conjunction, using other mechanisms to form compound sentences (e.g., a comma, a semicolon, a coordinating conjunction), using independent markers (e.g., therefore, moreover, thus, consequently, however, also), using dependent markers (e.g., a complex sentence has at least one independent clause and at least one dependent clause joined using a dependent marker), and the like. Therefore, conjunctions are relevant to more than just detecting multiple intents. For instance, conjunctions can influence the order in which intents are handled.

The following is a more detailed, but non-exhaustive, list of example English language conjunctions that can be taken into consideration as part of multiple intent analysis. In the English language, there are seven words that function as coordinating conjunctions: and, but, for, or, nor, so, yet. However, as shown below, coordinating conjunctions can be formed by word combinations. The list of example conjunctions below is presented in terms of how a bot should be expected to process the conjunctions, instead of strictly classifying the conjunctions according the three categories mentioned above (coordinating, subordinating, and correlative). As indicated in the list below, certain conjunctions can be used in multiple ways.

Subordinating conjunctions: after, once, although, as, as far as, as if, as long as, as soon as, as though, because, before, even if, even though, every time, if, in order that, since, so, so that, though, unless, until, when, whenever, where, whereas, wherever, while, if only, rather than, whether.

Conjunctions indicating that a part before the conjunction is temporally dependent on a part after the conjunction (A depends on B): once, as soon as, when, wherever, whenever, every time.

Conjunctions indicating that a part after the conjunction is temporally dependent on a part before the conjunction (B depends on A): before, then.

Explanatory conjunctions: because, since, in order that, so, so that, although, as, as far as, as if, as though, even if, even though, though, where, whereas, while, rather than, whether.

Conjunctions indicating pre-conditions: if only, if, as long as.

Conjunctions indicating exceptions: unless.

Conjunctions that serve as end of sentence markers: ".", "!", "?".

Prominent coordinating conjunctions: and, or, yet, but.

Precedence analyzer 430 analyzes each utterance constructed by the splitter 420 to determine an order in which to handle the utterances, e.g., an order in which the utterance are to be provided to an intent classifier. The order can be determined based on the structure of the utterances and the presence of certain words that signal precedence. For instance, as indicated in the example list of conjunctions above, the conjunctive words "before", "after", "and then", and "only if" are some examples of words that can indicate order. The precedence analyzer 430 can take into consideration the extracted information 404 when deciding the order. For instance, the extracted information 404 can indicate important parts of the utterance 402 such as verbs and predicates (e.g. noun phrases) associated with the verbs. The precedence analyzer 430 places the utterances constructed by the splitter 420 into the queue 440 in the determined order.

Queue 440 stores utterances for further processing, e.g., explicit invocation analysis or intent classification for determining which bot or intent within a bot to route an utterance to. Utterances may enter and leave the queue 440 one at a time. Queue 440 enforces the order determined by precedence analyzer 430 and holds utterances until they are ready to be processed. For example, queue 440 can be implemented as a first-in, first-out buffer in which an utterance entering the queue is a highest priority utterance 433 among the utterances constructed by the splitter 420 (e.g., one of the utterances 422 or 424), and in which an utterance 445 leaving the queue for further processing is the oldest utterance in the queue.

Example Rules for Multiple Intents

The following are some examples of rules and definitions for structural elements to which the rules are applied in order to detect multiple intents in an English language utterance and to split the utterance into a separate utterance for each detected intent. The examples below include rules for different types of sentences. The examples provided below are meant to be illustrative examples and are not meant to be limiting.

When an utterance is parsed, elementary structures that make up the sentence or sentences of the utterance are determined. A sentence is made up of certain elementary structures, including: subject, predicate, object, indirect object, complement. The subject and predicate make up the two basic structural parts of any complete sentence. When either the subject or the predicate is missing, the sentence is considered a fragment. Subjects and predicates are valuable clues to the presence of multiple intents.

Subject: who/what the sentence is about or a person/thing/place that is performing the action in the sentence. A subject can be a pronoun (e.g., John, he). Subjects can also include words, a phrase, or a clause that modifies a noun, e.g., "The cat in front of the door."

Predicate: expresses being/action. In its simplest form, a predicate is a verb. Similar to subjects, predicates can contain modifying words, phrases or clauses.

Simple sentence: a simple sentence consists of only one clause, specifically, an independent (or main) clause that can stand by itself. Simple sentences contain a subject and a verb, and makes a complete thought by itself. Examples of simple sentences:

"I would like to order a pizza."

"I would like to order a pizza and a coke."

Simple sentences can express one or more intents. In the first simple sentence example above, there is only one intent, "order pizza." In the second simple sentence example above, there are two intents, which can be expressed as "order pizza" and "order coke."

The syntactic structure of the second simple sentence example can be characterized as an independent clause "I would like to order a pizza" joined by a coordinating conjunction "and" to a fragment "a coke". Both the independent clause and the fragment are noun phrases (NPs). Here, the two intents are a result of two conjuncts (the NPs) sharing the same subject and the same predicate.

Multiple Intent Detection Rule 1: If there is an NP that is an independent clause joined by a coordinating conjunction (CC) to a second NP, and the second NP ends the sentence, then the sentence is a simple sentence representing multiple intents.

Corresponding Sentence Splitting Rule 1: Separate the independent clause and use the independent clause as-is. Combine the relevant portion of the independent clause with the second NP, e.g., by removing the predicate "order a pizza" so that only the subject "I would like to" remains. Thus, the second simple sentence example could be split into:

"I would like to order a pizza" and

"I would like to order a coke."

A coordinating conjunction can join words, phrases or clauses, and can therefore appear in other types of sentences structures besides simple sentences. Multiple intent detection and sentence splitting should be able to handle different sentence structures and to determine whether the parts joined by a coordinating conjunction have equivalence. The connected linguistic units in some coordinating conjunctions (e.g., and, or, but) have equivalence. Examples with equivalent elements highlighted in bold italics:

I want to order pizza and coke: NP+CC+NN (noun)
I want to order and eat a pizza: Verb+CC+Verb
I and my sister would like to order pizza: PRN (personal noun)+CC+NP An MIS may not be able to detect multiple intents in every instance, but should be provided with a set of rules that enable the MIS to resolve at least the most prevalent cases. In certain embodiments, this includes cases where the parts joined by a coordinating conjunction are verbs or verb phrases and/or cases where there are multiple subjects in the utterances.

Another commonly encountered case that can be handled by an MIS is when there are two intents where the action or task to be performed is different, for example:

I would like to order a new pizza and cancel my previous order.

The example above is also an example in which the parts representing separate intents are verb phrases (VPs) joined by a coordinating conjunction. A VP includes a verb and its dependents (objects), without any subject. Intents can also be presented by a prepositional phrase (PP). A PP includes a personal pronoun (PRP) plus a noun, personal noun (PRN), or gerund.

Multiple Intent Detection Rule 2: If there is a CC between a first part and a second part, and each part is a VP or PP, then the utterance is a simple sentence representing multiple intents.

Corresponding Sentence Splitting Rule 2: Separate the first part (an independent clause) and use the independent clause as-is. Combine the relevant portion of the first part with the second part. Thus, the example above could be split into:

"I would like to order a new pizza" and
"I would like to cancel my previous order."

Compound sentence: a compound sentence consists of two or more independent clauses joined by a semicolon, or a comma and coordinating conjunction. In some cases, a compound sentence includes an independent marker. Examples of independent markers include: therefore, moreover, thus, consequently, however, also.

Example with semicolon: "Malls are great places to shop; I can find everything I need under one roof"

Multiple Intent Detection Rule 3: If there is a semicolon between two independent clauses, then the utterance is a compound sentence representing multiple intents.

Corresponding Sentence Splitting Rule 3: Separate both independent clauses and use the independent clauses as-is. Thus, the example above could be split into:

"Malls are great places to shop" and
"I can find everything I need under one roof."

Example with comma and coordinating conjunction: "The new boots are light and comfortable, and I want to order them again." Here, the structure of the utterance can be characterized by the minimal construct: subject+verb+","+CC+subject+verb.

Multiple Intent Detection Rule 4: If there are two independent clauses separated by the combination of a comma plus a coordination conjunction [, CC] then the utterance is a compound sentence representing multiple intents.

Corresponding Sentence Splitting Rule 4: Separate both independent clauses and use the independent clauses as-is. Thus, the example above could be split into:

"The new boots are light and comfortable" and
"I want to order them again."

Example with independent marker (IM): "The new boots are light and comfortable; therefore, I want to order them again."

Multiple Intent Detection Rule 5: If there are two independent clauses joined by the combination of a semicolon plus independent marker plus comma [; IM]+[,] then the utterance is a compound sentence representing multiple intents.

Corresponding Sentence Splitting Rule 5: Separate both independent clauses and use the independent clauses as-is. Thus, the example above could be split into:

"The new boots are light and comfortable" and
"I want to order them again."

In the example above, the independent marker "therefore" indicates that there is a casual relationship between the independent clauses. Relationships can be causal (e.g., therefore, consequently) or additive (e.g., also, moreover). When there is a causal relationship, there is in reality only one intent, not multiple intents. Therefore, when a causal relationship exists, the utterance can be split, but the relationship may be flagged and both parts provided to the same bot so that the bot can decide, based on the relationship, how to handle the parts.

Complex sentence: a complex sentence has at least one independent clause and at least one dependent clause joined using dependent markers.

Example: "Because the new boots are light and comfortable, I want to order them again." Here, the structure of the utterance can be characterized as dependent marker+dependent clause+comma+independent clause.

Multiple Intent Detection Rule 6: If an utterance begins with a dependent marker (DM) followed by a dependent clause, a comma [,] and then an independent clause, then the utterance is a complex sentence representing multiple intents.

Corresponding Sentence Splitting Rule 6: Separate the independent clause and use the independent clauses as-is. Form a sentence as the dependent clause minus the dependent marker (e.g., the word "because"). Thus, the example above could be split into:

"The new boots are light and comfortable" and
"I want to order them again."

Structurally, the statement in the complex sentence example above can be rearranged without loss of meaning, for example, in the form of independent clause+comma+dependent marker+dependent clause:

"I want to order the new boots again, because they are light and comfortable."

Multiple Intent Detection Rule 7: If an utterance contains an independent clause followed by a comma, a dependent marker and finally a dependent clause, then the utterance is a complex sentence representing multiple intents.

Corresponding Sentence Splitting Rule 7: same as Sentencing Splitting Rule 6, except that the order in which the resulting utterances are produced is reversed.

In the second complex sentence example above, where the utterance begins with an independent clause instead of a dependent marker, the dependent clause does not actually represent a separate intent, but instead serves as an explanation for the independent clause (why the user wants to order the new boots again). This is another example of a situation where an MIS could split an utterance into two parts, but also flag the relationship between the parts.

Flagging the relationship in this case would enable a bot receiving the explanatory part to know that there is no intent associated with this part. The explanatory part can still serve a purpose despite not representing any intent. For example, the bot may analyze the explanatory part to determine the sentiment attached to the entity involved (the new boots) and then determine an action or response based on the sentiment.

In addition to explanations, complex sentences can involve other types of relationships between different parts of a sentence. For instance, complex sentences sometimes involve an order of precedence. As indicated earlier, after an utterance is split into two or more parts, a determination can be made as to which of the two or more parts to handle first. This determination can be performed through keeping track of relationships between sentence parts, based on syntax and/or dependent markers. A complex sentence can indicate:

Precedence: e.g., "I want to send money to mom, if I have enough in my account."

Explanations: e.g., "I want to renew my driver's license, since it has expired."

An event trigger: e.g., "I want google maps to open, whenever I login."

An exception: e.g., "Please reset my password, unless there is a way around it."

Compound-Complex sentence: a compound-complex sentence (also referred to as a complex-compound sentence) is a sentence with at least one dependent clause and at least two independent clauses. Compound-complex sentences can be handled by applying the rules described above for compound sentences and complex sentences. The compound portion of a compound-complex sentence can be treated as a stand-alone sentence and analyzed separately from the complex portion. Compound-complex sentences may involve nested relations. In certain embodiments, nested relations are handled through recursive analysis to detect multiple intents in different parts of a sentence and then determine, for each part, whether there are additional multiple intents. This enables nested relations to be handled all the way to the elemental (linguistic) units level. As an alternative to recursive analysis, the sentence can be simplified by only considering the part of the sentence up to the first (independent or dependent) marker. The rest of the sentence can be provided as input to a bot for handling.

Figure 5:
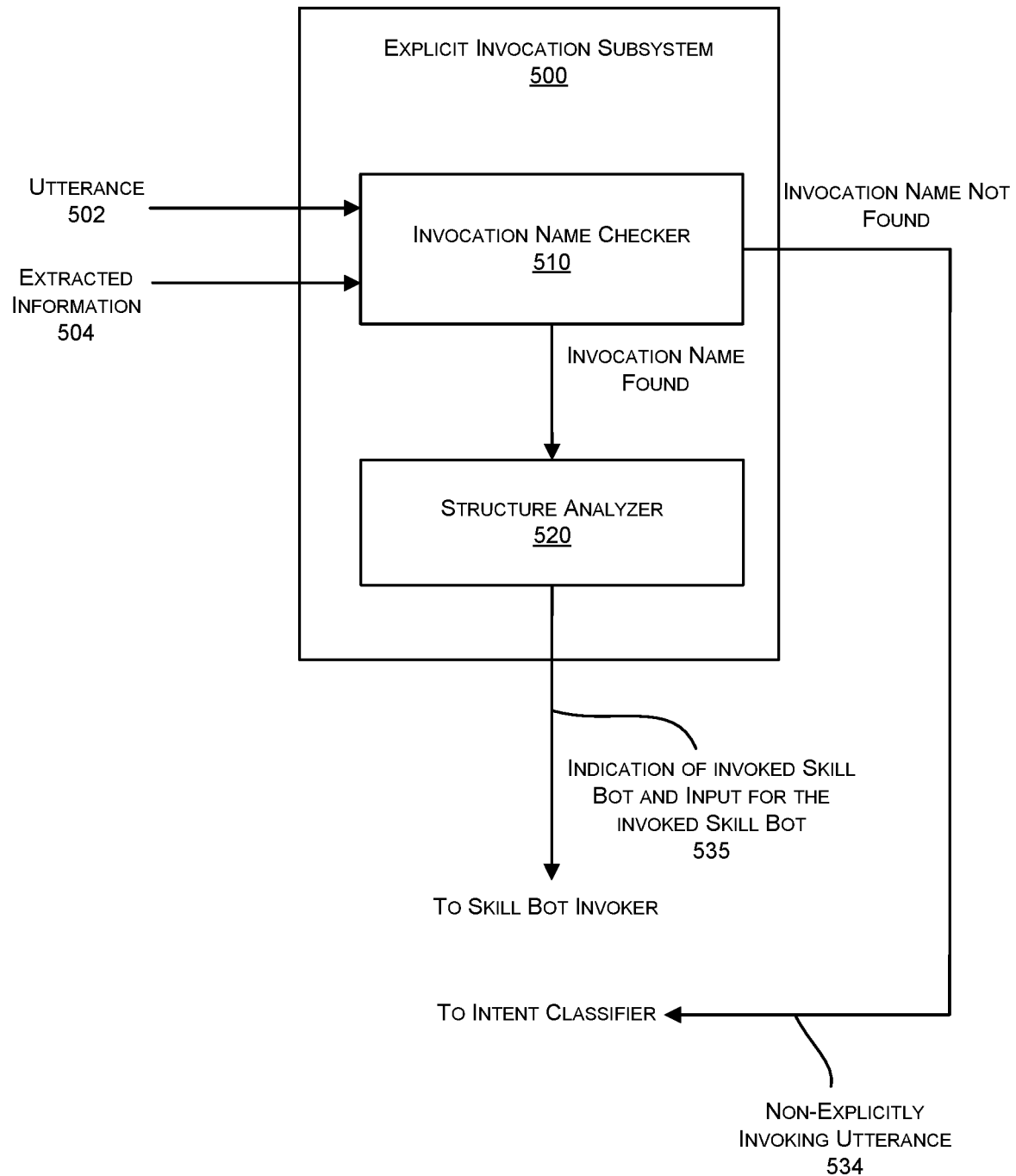
FIG. 5 depicts an explicit invocation subsystem according to certain embodiments.

FIG. 5 depicts an EIS 500 according to certain embodiments. In certain embodiments such as the embodiment of FIG. 2, the EIS 500 implements an EIS in a master bot (e.g., EIS 230). As depicted in FIG. 5, the EIS 500 includes an invocation name checker 510 and a structure analyzer 520. Although depicted as separate, the various components of the EIS 500 can be combined with each other or arranged other ways.

Invocation name checker 510 searches for an utterance 502 to determine whether the utterance 502 includes an invocation name of a skill bot. In certain embodiments, the invocation name checker 510 first examines extracted information 504 for the utterance 502 to determine whether there is any indication of an invocation name. For example, invocation name checker 510 can examine POS tags to look for a noun potentially corresponding to an invocation name. If the extracted information 504 does not indicate at least the possibility of the utterance 502 containing an invocation name, then the utterance 502 is deemed to be a non-explicitly invoking utterance 534. Otherwise, the invocation name checker 510 proceeds to perform a word search of the utterance 502 to match against a list of known invocation names. If an invocation name is found in the utterance 502, the invocation name checker 510 communicates the invocation name to the structure analyzer 520. If an invocation is not found, then the utterance 502 is passed to an intent classifier (e.g., intent classifier 242) for implicit invocation analysis.

Structure analyzer 520 is similar to the structure analyzer 410 of MIS 400 in FIG. 4, in that the structure analyzer 520 analyzes the sentence structure of an utterance (in this case, an utterance determined to be explicitly invoking) for determining what parts of the utterance are relevant. In the context of explicit invocation, the relevant part of an utterance is the part that is not associated with the invocation itself. For example, if the utterance 502 is "I want to order a pizza using Pizza Bot", the part associated with the invocation is "using Pizza Bot" and does not contain any useful information for the pizza bot. Therefore, when the pizza bot is invoked, it should be given "I want to order a pizza" as an input instead of the complete utterance. The structure analyzer 520 will generate an output 535 to a skill bot invoker indicating which skill bot is being explicitly invoked (e.g., the invocation name found by the invocation name checker 510). Additionally, if there exists a part of the utterance 502 that is not associated with the invocation, then the structure analyzer 520 will include this part of the utterance in the output 535, possibly after some reformatting. In response to the output 535, the skill bot invoker (e.g., skill bot invoker 240) will invoke the skill bot and provide, as input to the skill bot, the part not associated with the invocation.

Example Rules for Explicit Invocation

The following are some examples of explicit invocations and rules for constructing an utterance for input to a bot being explicitly invoked. The examples described in this section are meant to be illustrative and are not intended to be limiting. As with the rules for sentence splitting in connection with multiple intent detection, different rules are applied for constructing an utterance in connection with explicit invocation depending on the sentence structure of the utterance. For instance, as explained earlier, utterances be fragments, simple sentences, compound sentences, complex sentences, etc. Explicit invocations can appear in any of these sentence structures, and the relevant portion of an utterance to send as input to a bot will vary accordingly. As such, the example explicit invocation rules described below are designed to refine an explicitly invoking utterance into an utterance that contains only the relevant portion and not the portion associated with the invocation.

The example explicit invocations shown below mainly involve sentences that are well-formed. However, this is not intended to be limiting. As explained below, the multiple intent analysis techniques described herein are better-suited to detecting multiple intents when an utterance is a well-formed sentence. In such cases, the utterance can readily be split into two or more utterances for explicit invocation analysis of each utterance in the two or more utterances. In certain embodiments, when an utterance is not well-formed, explicit invocation analysis is performed on the entire utterance. This reflects a conservative approach that reduces the risk of separating closely-related parts of the utterance, and effectively treats the utterance as representing a single intent even if there are in fact multiple intents.

Use Case 1a: Fragment Without Other Noun Phrases
"Pizza Bot."
"Pizza Bot please."

Explicit Invocation Rule 1: If (1) an utterance is a fragment, (2) the fragment contains an invocation name, and (3) there are no other noun phrases (i.e., besides a noun phrase that includes the invocation name), then invoke the bot associated with the invocation name and without providing the bot any part of the utterance (e.g., pass an empty string).

Use Case 1b: Fragment With Additional Noun Phrase
"Pizza Bot cheese pizza."
"Pizza Bot, please cheese pizza."

Explicit Invocation Rule 2: If (1) an utterance is a fragment, (2) the fragment contains an invocation name, and (3) there is at least one other noun phrase, then invoke the bot associated with the invocation name and provide the bot with the other noun phrase(s) plus any modifiers associated with the noun phrase(s).

e.g., pass "cheese pizza."

Use Case 2a: Complete Sentence Without Other Predicate
"Go to Pizza Bot."

Explicit Invocation Rule 3: If (1) an utterance is not a fragment, (2) the utterance contains an invocation name that is either an object or a prepositional object (e.g., "Pizza_Bot"), (3) there is no other predicate (i.e., besides a predicate that includes the invocation name), and (4) there is no other noun phrase, then invoke the bot associated with the invocation name and without providing the bot any part of the utterance.

Use Case 2b: Complete Sentence With Another Predicate
"I want to go to Pizza Bot."

Explicit Invocation Rule 4: If (1) an utterance is not a fragment, (2) the utterance contains an invocation name that is either an object or a prepositional object, (3) there exists another predicate (e.g., "want") that has an open clausal complement (xcomp) dependency relationship with the invocation predicate (e.g., "go"), and (4) there is no other noun phrase, then invoke the bot associated with the invocation name and without providing the bot any part of the utterance. Applying Explicit Invocation Rule 4 to "I want to go to Pizza Bot" would avoid providing the bot with "I want to go to."

Use Case 3: Complete Sentence with Invocation Predicate that Includes a Non-Invoking Portion
"Place my order in Pizza Bot."

Explicit Invocation Rule 5: If (1) an utterance is not a fragment, (2) the utterance contains an invocation name that is a prepositional object, (3) there is no other predicate besides the invocation predicate, and (4) the invocation predicate includes a non-invoking portion (e.g., "order"), then invoke the bot associated with the invocation name and provide the bot with the utterance minus the prepositional object and minus the preposition.

e.g., pass "Place my order."

Examples of predicates that are invoking: go to, take me.

Use Case 4a: Complex Sentence
"when you go to pizza bot, order this."

This is a complex sentence which could be split, via multiple intent analysis, into "you go to pizza bot" and "order this." Here, the first phrase (you go to pizza bot) is clearly the predecessor of the second phrase (order this). This relationship between the first phrase and the second phrase can be flagged during multiple intents analysis so that when the pizza bot is invoked during explicit invocation analysis of the first phrase, both phrases are provided as input to the pizza bot.

Use Case 4b: Compound Sentence
"Go to Pizza Bot and place my order."

This is a compound sentence, i.e., a sentence with two or more independent clauses, and can be split, via multiple intent analysis, into "Go to Pizza Bot" and "place my order." Similar to the example in Use Case 4a, the first phrase (Go to Pizza Bot) is the predecessor of the second phrase (place my order). In Use Case 4a, the relationship between the phrases is indicated by the dependent marker "When". In Use Case 4b, the relationship is less clear because instead of a dependent marker, there is only a coordinating conjunction "and." In general, it is preferable to be conservative with splitting; an utterance should be split only if it is reasonably certain that there are separate intents. Therefore, the preferred behavior for Use Case 4b would be to avoid splitting the two phrases and instead analyze the entire utterance for explicit invocation purposes. This would result in explicit invocation of the pizza bot and input of the phrase "place my order" to the pizza bot.

Use Case 5a: Well-Formed Sentence
"Tell Pizza Bot; I want to place my order."

A well-formed sentence is one that is grammatically correct. Here, the utterance is well-formed because of the correct placement of a semicolon between the two phrases. Since Multiple Intent Detection Rule 3 above is satisfied by this example, the utterance should be split prior to explicit invocation analysis.

Use Case 5b: Not Well-Formed Sentence
"Tell Pizza Bot, I want to place my order."

In this example, the utterance is not well-formed because the use of a comma to separate the two phrases is grammatically incorrect. Since it is unclear here whether the utterance represents two intents, the utterance should not be split prior to explicit invocation analysis. However, the end-result may be that the utterance is handled correctly regardless of whether the utterance is split or not. If the utterance is not split, then it can be determined during explicit invocation analysis that the phrase "I want to place my order" should be input to the pizza bot. If the utterance is split, then the pizza bot can be explicitly invoked based on the first phrase (Tell Pizza Bot) and, upon returning from a conversation triggered by the first phrase, the second phrase (I want to place my order) might be passed to the pizza bot through implicit invocation using an intent classifier of a master bot. In either scenario, the pizza bot would ultimately receive and process the relevant part of the utterance (I want to place my order).

Use Case 6: Two Or More Invocation Names
"Get directions to pizza store using map bot," where "pizza store" is the invocation name of a pizza ordering bot and also the name of a pizza restaurant with a physical location.

Explicit Invocation Rule 6: if an utterance contains more than one invocation name, then do not treat the utterance as an explicit invocation. Instead, send the entire utterance for implicit invocation analysis using an intent classifier of a master bot.

When an utterance has more than one invocation name, it may be unclear whether the user is trying to invoke multiple skill bots. For instance, the user may want to invoke a first skill bot and happened to mention the name of a second skill bot. In this example, the user wants to provide the name of the pizza restaurant as an input to a mapping service bot name "map bot." A conservative approach to handling this situation would be to avoid explicit invocation of either bot, and to instead apply intent classification on the entire utterance to route the utterance to a particular bot. In this situation, intent classification will usually identify one of the two bots mentioned in the utterance. This is the approach in Explicit Invocation Rule 6.

Alternatively, in certain embodiments, the invocation name that is most closely related to a main verb (also referred to as a lexical verb) of the utterance can be identified and used as the basis for an explicit invocation. In this example, "Get" is a main verb. Although the invocation name "pizza store" is closer in proximity within the utterance to this main verb, the invocation name "map bot" is more closely related because the subject of the main verb is "directions" and the map bot is the bot capable of providing directions.

Example Methods

Figure 6:
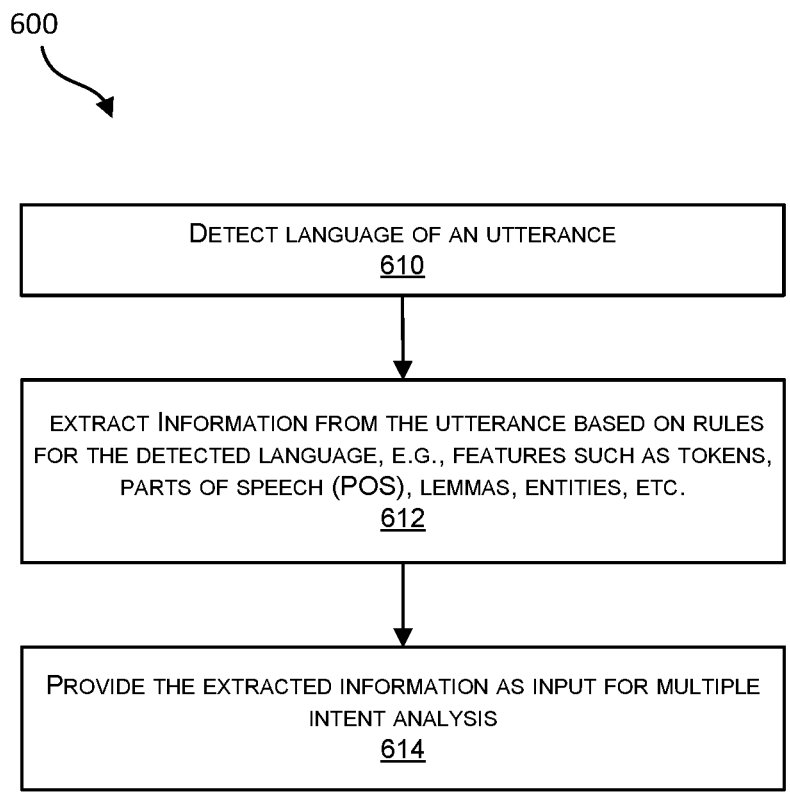
FIG. 6 is a flowchart illustrating a process for pre-processing an utterance according to certain embodiments.

FIG. 6 is a flowchart illustrating a process 600 for pre-processing an utterance according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 6 may be performed by a pre-processing subsystem (e.g., pre-processing subsystem 210) to generate extracted information for analysis by one or more additional subsystems (e.g., MIS 220 or EIS 230).

At 610, the language of an utterance is detected from the text of the utterance. For example, the utterance "I would like to open a checking account and transfer money from it" can be detected as an English language utterance. Language detection may involve the use of one or more dictionaries, for example, matching against dictionary words or identifying certain lexicographical features. In certain embodiments, at least one dictionary is provided for each language to be detected.

At 612, information is extracted from the utterance. The extracted information can be analyzed to obtain a generic understanding of the utterance and is extracted based on a set of rules specific to the language detected in 610. In certain embodiments, the extracting of the information in 612 involves parsing the utterance to determine the following:
Tokens: e.g., [I, would, like, to, open, a, checking, account, and, transfer, money, from, it].
POS tags: e.g., for the utterance above, the following sequence of tags can extracted: [personal pronoun (PRP), modal (MD), verb (VB), the word "to", VB, determiner (DT), noun (NN), NN, coordinating conjunction (CC), VB, NN, preposition (IN), PRP].
Named entities: e.g., [checking]
Lemmas: e.g., [I, would, like, to, open, a, . . . ]
Dependencies: dependencies indicate relationships between linguistic units (e.g., words that have been tokenized). Linguistic units are the elemental units of an utterance. Examples of dependencies include subjects, prepositional objects, auxiliaries (e.g., the non-main verb in a clause with multiple verbs), conjuncts, and the like. For instance, in the utterance above (I, like) is a subject and (would, like) is an auxiliary. In certain embodiments, the dependencies are output in the form of a dependency tree.

Figure 7:
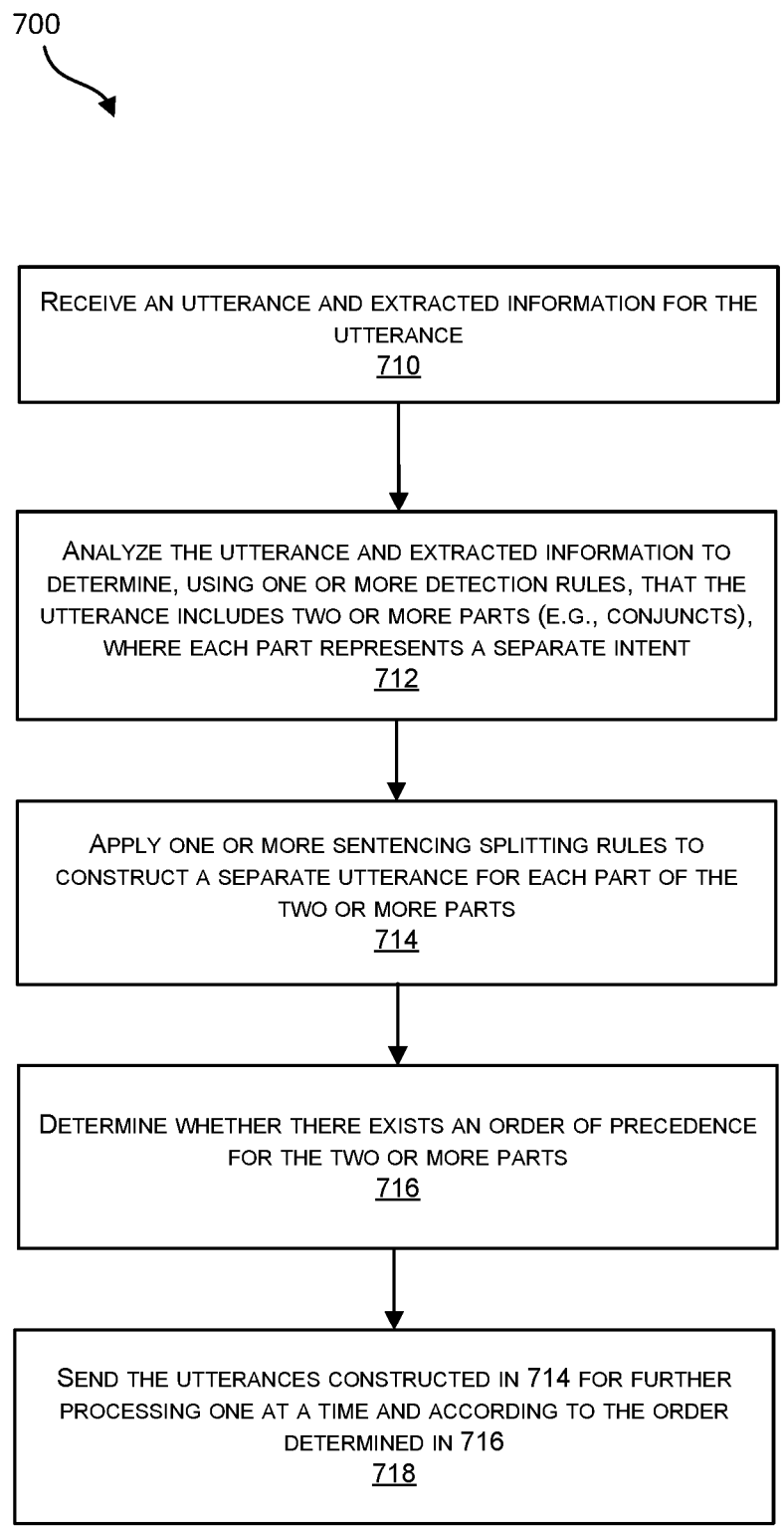
FIG. 7 is a flowchart illustrating a process for handling multiple intents according to certain embodiments.

At 614, the information extracted in 612 is provided as input for multiple intent analysis, e.g., analysis according to the method depicted in FIG. 7. As indicated earlier, multiple intent analysis can be performed prior to explicit invocation analysis and intent classification.

FIG. 7 is a flowchart illustrating a process 700 for handling multiple intents according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. Although FIG. 7 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 7 may be performed by a multiple intent subsystem (e.g., MIS 220).

At 710, an utterance is received together with extracted information for the utterance. The extracted information can be information generated through parsing the utterance, for example, according to the method depicted in FIG. 6.

At 712, the utterance and the extracted information are analyzed to determine that the utterance includes two or more parts (e.g., conjuncts), where each part represents a separate intent. The analysis in 712 involves applying one or more detection rules (e.g., whichever ones of Detection Rules 1 to 7 described above are applicable) to match the utterance to a sentence pattern indicative of the presence of multiple intents. As explained above, one feature that a detection rule can look for is a coordinating conjunction. However, the presence of a coordinating conjunction alone may not be sufficient to conclusively determine that there are multiple intents. Accordingly, the detection rules described above are designed to analyze overall sentence structure and capture the most prevalent cases of multiple intents.

At 714, one or more sentencing splitting rules are applied to construct a separate utterance for each part of the two or more parts identified in 712 (e.g., "I would like to open a checking account" and "transfer money from it"). A sentence splitting rule applied in 714 can be a rule corresponding to a detection rule that was satisfied in 712.

In certain embodiments, the utterances constructed in 714 are refined and analyzed to generate additional contextual information about these utterances. The refinement and analysis may involve identifying sentence objects, e.g., "I would like to open a checking account" and "transfer money" and then performing co-reference resolution and chunking on each identified sentence object. For example, the words "checking" and "account" can be chunked into a compound expression "checking_account" and the word "it" may be identified as a co-reference to checking_account. As another example, in certain embodiments, an utterance may be analyzed to determine whether the utterance is a fragment, an interrogative question, a yes/no type question, an imperative (expressing a command or request), a declarative statement (conveying information or making a statement), and the like. For instance, it may be determined that the sentence object "I would like to open a checking account" is a declarative statement. This additional contextual information can be provided as a supplement to the constructed utterances, e.g., to improve the accuracy of explicit invocation analysis or intent classification.

In 716, a determination is made as to whether there exists an order of precedence for the two or more parts identified in 712. For example, as indicated above, precedence can be determined through detection of independent or dependent markers. If there is an order of precedence, then the utterances constructed in 714 are processed in the same order as their corresponding parts. Otherwise, the utterances constructed in 714 can be processed in the order in which the parts appear in the original utterance received in 710, e.g., from left to right.

In certain situations, even though an utterance is split into two or more utterances, the resulting utterances may be treated as a single unit because there is only one intent. For instance, as explained earlier, sometimes part of a sentence is explanatory. Such situations can be identified as part of the processing in 716, treated as exceptions, and flagged when they occur so that the utterance can be handled appropriately.

At 718, the utterances constructed in 714 are sent for further processing one at a time and according to the order determined in 716. For example, the utterances can be placed into a queue based on the order determined in 716 and then de-queued for explicit invocation analysis, where de-queuing occurs upon returning from a conversation associated with a particular bot intent.

Figure 8:
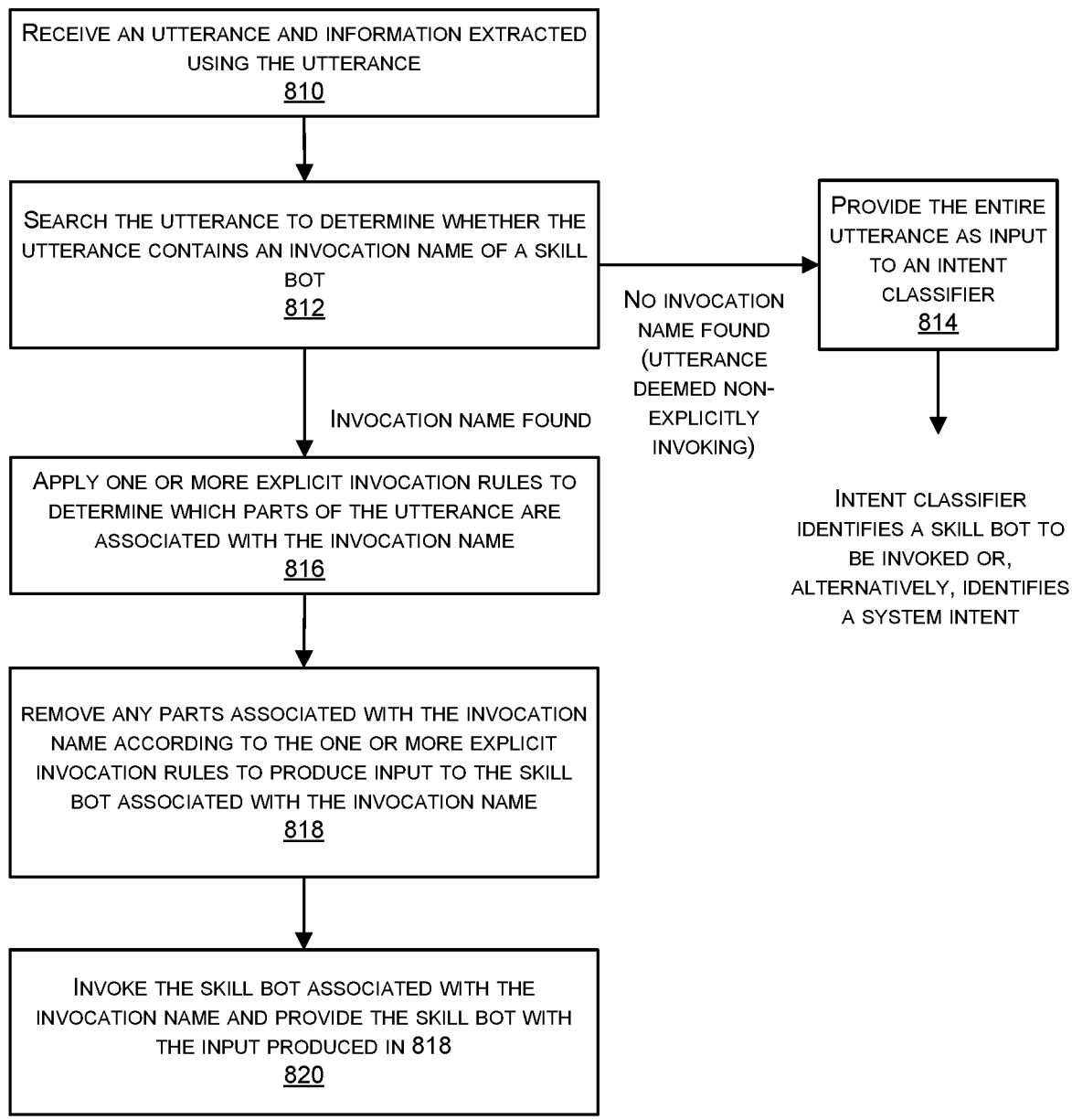
FIG. 8 is a flowchart illustrating a process for handling explicit invocation according to certain embodiments.

FIG. 8 is a flowchart illustrating a process 800 for handling explicit invocation according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 8 may be performed by an explicit invocation subsystem (e.g., EIS 230) and a skill bot invoker in communication with the explicit invocation subsystem (e.g., skill bot invoker 240).

At 810 an utterance is received together with information extracted using the utterance (e.g., POS tags, tokens, dependency information, and the like). The utterance in 810 can be an utterance constructed as a result of performing multiple intent analysis (e.g., utterance 206 or utterance 208 in FIG. 2). However, in certain embodiments, multiple intent analysis can be deferred until after explicit invocation analysis has been completed or may not be performed at all.

At 812, the utterance is searched to determine whether the utterance contains an invocation name of a skill bot. In certain embodiments there may be some preliminary analysis of the extracted information received in 810 to determine, prior to performing word matching, whether the utterance contains any indication that it includes an invocation name. If no invocation name is found, then the utterance is deemed to be non-explicitly invoking and the process proceeds to 814. If it is determined that there is an invocation name, then the utterance is deemed to be an explicit invocation and the process proceeds to 816.

At 814, the entire utterance that was received in 810 is provided as input to an intent classifier 814. The intent classifier that receives the utterance in 814 can be an intent classifier of a master bot (e.g., intent classifier 242 in FIG. 2). The intent classifier can be a machine-learning-based or rules-based classifier that was trained to determine whether the intent of the utterance matches to a system intent (e.g., exit, help) or to a particular skill bot. As explained earlier, intent analysis performed by a master bot may be limited to matching to a particular skill bot without determining which intent within the particular skill bot is the best match for the utterance. Thus, the intent classifier that receives the utterance in 814 may identify a particular skill bot to be invoked. Alternatively, if the utterance represents a particular system intent (e.g., the utterance contains the words "exit" or "help"), then the intent classifier that receives the utterance in 814 may identify the particular system intent to trigger a conversation between the master bot and the user based on a dialog flow configured for this particular system intent.

At 816, one or more explicit invocation rules are applied to determine which parts of the utterance are associated with the invocation name. The determination in 816 can be based on analysis of the sentence structure of the utterance using POS tags, dependency information, and/or other extracted information received in 810. For instance, a part associated with the invocation name can be a noun phrase including the invocation name (e.g., Use Case 1a) or a prepositional object corresponding to the invocation name (e.g., Use Case 3).

At 818, any parts associated with the invocation name, as determined based on the processing in 816, are removed. Other parts of the utterance that are not needed for conveying the meaning of the utterance (e.g., a preposition word) can also be removed in 818. The removal of certain parts of the utterance in 818 produces input for the skill bot associated with the invocation name. If there are any parts of the utterance received in 810 that remain after the removal in 818, the remaining parts form a new utterance for input to the skill bot, e.g., as a text string. Otherwise, if the utterance received in 810 is completely removed, then the input may be an empty string.

At 820, the skill bot associated with the invocation name is invoked and the skill bot is provided with the input produced in 818. Upon receiving the input produced in 818, the invoked skill bot will handle the input, for example, by performing intent analysis using an intent classifier of the skill bot to identify a bot intent matching the user intent represented in the input. Identification of the matching bot intent may result in the skill bot performing a particular action or starting a conversation with the user in accordance with a dialog flow associated with the matching bot intent. For instance, if the input is an empty string, a conversation could be started in a default state defined for the dialog flow, e.g., a welcome message. Alternatively, if the input is not an empty string, then the conversation could be started in some intermediate state, e.g., because the input contains a value for an entity or some other information that the skill bot no longer needs to ask the user for by virtue of having received this information as part of the input. As another example, the skill bot may decide that it cannot handle the input (e.g., because the confidence scores of every bot intent configured for the skill bot are below a certain threshold). In this situation, the skill bot may refer the input back to the master bot for handling (e.g., intent analysis using the intent classifier of the master bot), or the skill bot may prompt the user for clarification.

Example Computing Environments for Implementing a Chatbot System

Figure 9:
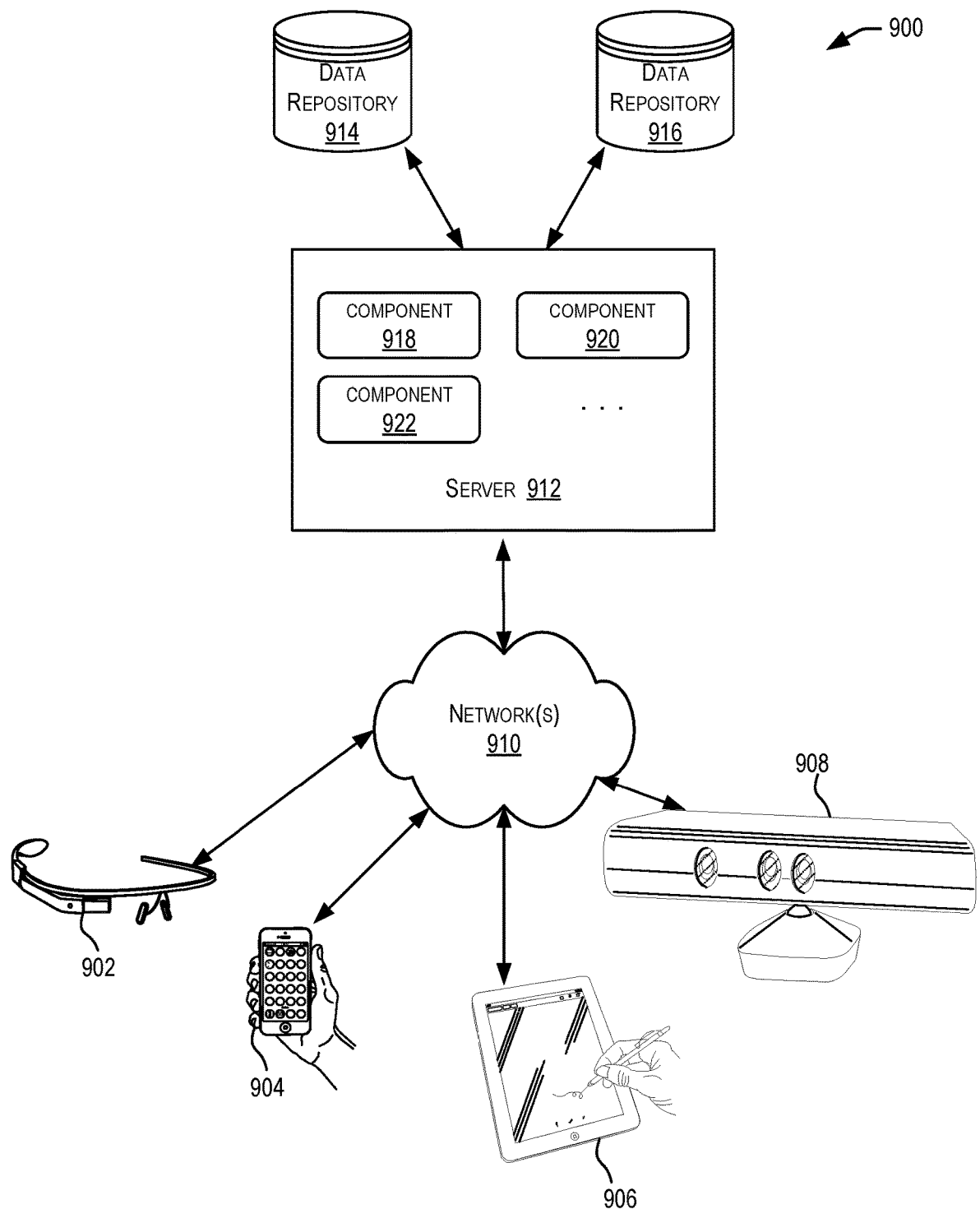
FIG. 9 depicts a simplified diagram of a distributed system for implementing an embodiment.

FIG. 9 depicts a simplified diagram of a distributed system 900 for implementing an embodiment. In the illustrated embodiment, distributed system 900 includes one or more client computing devices 902, 904, 906, and 908, coupled to a server 912 via one or more communication networks 910. Clients computing devices 902, 904, 906, and 908 may be configured to execute one or more applications.

In various embodiments, server 912 may be adapted to run one or more services or software applications that enable the multiple intent and explicit invocation related processing described in this disclosure.

In certain embodiments, server 912 may also provide other services or software applications that can include non-virtual and virtual environments. In some embodiments, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, server 912 may include one or more components 918, 920 and 922 that implement the functions performed by server 912. These components may include software components that may be executed by one or more processors, hardware components, or combinations thereof. It should be appreciated that various different system configurations are possible, which may be different from distributed system 900. The embodiment shown in FIG. 9 is thus one example of a distributed system for implementing an embodiment system and is not intended to be limiting.

Users may use client computing devices 902, 904, 906, and/or 908 to interact with server 912 in accordance with the teachings of this disclosure, for example, to provide utterances for processing by a master bot and/or skill bot. A client device may provide an interface that enables a user of the client device to interact with the client device. The client device may also output information to the user via this interface. Although FIG. 9 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 910 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics Engineers (IEEE) 9002.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization such as one or more flexible pools of logical storage devices that can be virtualized to maintain virtual storage devices for the server. In various embodiments, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain embodiments. For example, one or more of the data repositories 914, 916 may be used to store data or information generated by the processing described herein and/or data or information used for the processing described herein. For example, data depositories 914, 916 may store rules, skill bot configuration information, system intent related information, and/or other information used to provide the multiple intent and explicit invocation related functionalities described above. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain embodiments, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 914, 916 may also be used by applications to store application data. The data repositories used by applications may be of different types such as, for example, a key-value store repository, an object store repository, or a general storage repository supported by a file system.

Figure 10:
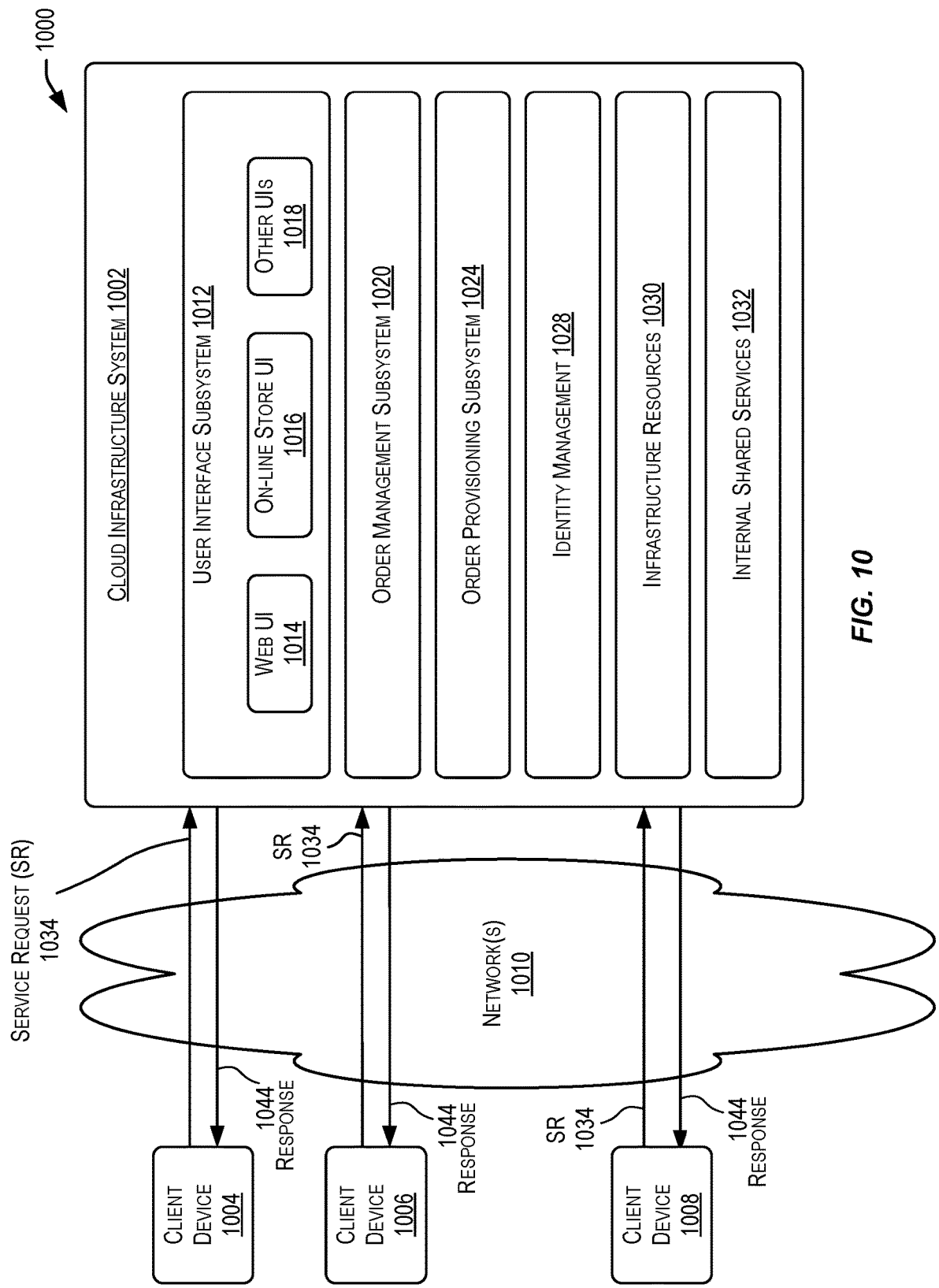
FIG. 10 is a simplified block diagram of a cloud-based system environment in which various chatbot-related services may be offered as cloud services, in accordance with certain embodiments.

In certain embodiments, the multiple intent and explicit invocation related functionalities described in this disclosure may be offered as services via a cloud environment. FIG. 10 is a simplified block diagram of a cloud-based system environment 1000 in which multiple intent and explicit invocation related functionalities described herein may be offered as cloud services, in accordance with certain embodiments. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and cloud infrastructure system 1002. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some other embodiments, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative embodiments.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002. Cloud infrastructure system 1002 then performs processing to provide the services requested in the customer's subscription order. For example, in certain embodiments, the multiple intent and explicit invocation related functionalities described herein may be provided as cloud services that are subscribed to by a user/subscriber. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third party cloud services provider and the cloud services are offered to any general public customer, where the customer can be an individual or an enterprise. In certain other embodiments, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request a multiple intent or explicit invocation related service described in this disclosure.

In some embodiments, the processing performed by cloud infrastructure system 1002 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain embodiments, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a consumer, and other interfaces 1018. For example, a customer may, using a client device, request (service request 1034) one or more services provided by cloud infrastructure system 1002 using one or more of interfaces 1014, 1016, and 1018. For example, a customer may access the online store, browse cloud services offered by cloud infrastructure system 1002, and place a subscription order for one or more multiple intent or explicit invocation related services offered by cloud infrastructure system 1002 that the customer wishes to subscribe to. The service request may include information identifying the customer and one or more services that the customer desires to subscribe to.

In certain embodiments, such as the embodiment depicted in FIG. 10, cloud infrastructure system 1002 may comprise an order management subsystem (OMS) 1020 that is configured to process the new order. As part of this processing, OMS 1020 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1020 may then invoke the order provisioning subsystem (OPS) 1024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services. For example, the response may include a confirmation that explicit invocation functionality has been successfully configured for a particular skill bot based on registration of an invocation name for the particular skill bot. As another example, the response may include a confirmation that multiple intent functionality has been successfully configured based on provision of a set of one or more rules that govern splitting of utterances based on detection of multiple intents.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain embodiments, cloud infrastructure system 1002 comprises an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
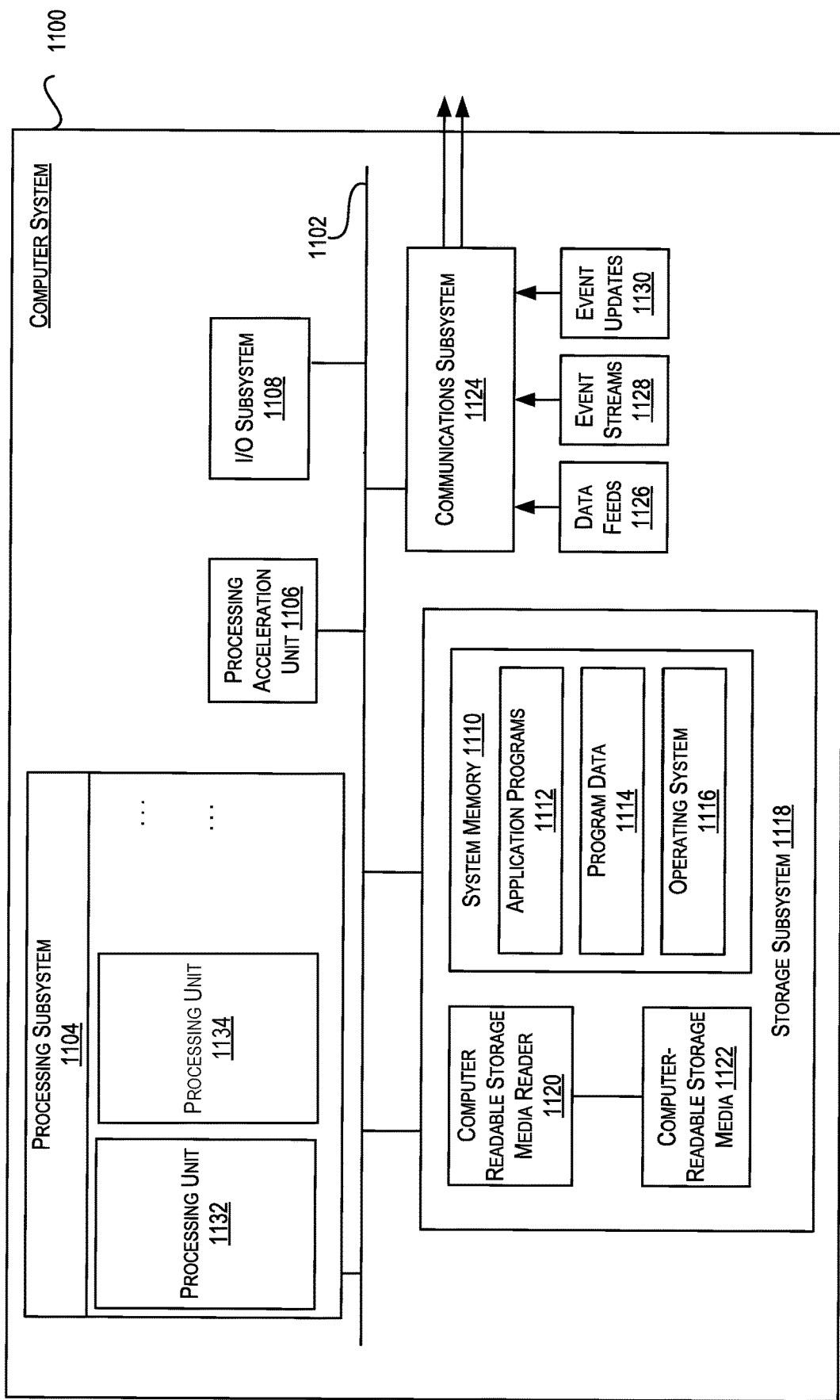
FIG. 11 illustrates an exemplary computer system that may be used to implement certain embodiments.

FIG. 11 illustrates an exemplary computer system 1100 that may be used to implement certain embodiments. For example, in some embodiments, computer system 1100 may be used to implement any of the system and subsystems of a chatbot system (e.g., a master bot and one or more skill bots), and various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communications subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may include be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as application specific integrated circuits (ASICs), or field programmable gate arrays (FPGAs).

In some embodiments, the processing units in processing subsystem 1104 can execute instructions stored in system memory 1110 or on computer readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain embodiments, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some embodiments. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1122 may store programming and data constructs that provide the functionality of some embodiments. Computer-readable media 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1118 may also include a computer-readable storage media reader 1120 that can further be connected to computer-readable storage media 1122. Reader 1120 may receive and be configured to read data from a memory device such as a disk, a flash drive, etc.

In certain embodiments, computer system 1100 may support virtualization technologies, including but not limited to virtualization of processing and memory resources. For example, computer system 1100 may provide support for executing one or more virtual machines. In certain embodiments, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices. For example, the communication subsystem may be used to establish a communication channel between a client device and a bot.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communications subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a computer system with at least one chatbot, an utterance, wherein the utterance comprises text forming at least a sentence fragment;
   parsing, by the computer system, the utterance, the parsing producing information on a sentence structure of the utterance;
   identifying, by the computer system, one or more rules that are applicable to the sentence structure of the utterance;
   detecting, by the computer system using the one or more rules, that the utterance comprises two or more parts which represent separate user intents;
   splitting, by the computer system, the utterance into the two or more parts;
   analyzing, by the computer system, the two or more parts separately, wherein the analyzing comprises identifying a first chatbot for handling a first part of the two or more parts; and
   communicating, by the computer system, the first part to the first chatbot.

2. The method of claim 1, further comprising:
   determining, by the computer system, that a user intent represented in the first part corresponds to a bot intent with which the first chatbot has been configured, wherein the bot intent represents a task that the first chatbot is capable of performing.

3. The method of claim 2, further comprising:
   determining, by the computer system executing the first chatbot, a response to the first part, wherein the response is associated with the bot intent and comprises an action to be performed by the first chatbot or a message for the user.

4. The method of claim 2, wherein determining that the user intent represented by the first part corresponds to the bot intent comprises analyzing the first part using a classifier that has been trained on a set of one or more example utterances provided for the bot intent.

5. The method of claim 1, wherein detecting that the utterance comprises two or more parts which represent separate user intents comprises determining, using the information on the sentence structure of the utterance, that the utterance matches a sentence pattern specified by the one or more rules.

6. The method of claim 5, wherein the information on the sentence structure of the utterance includes part of speech (POS) tags for the utterance and information on dependencies between linguistic units in the utterance, and wherein the sentence pattern is specified in terms of POS tags and dependencies between linguistic units.

7. The method of claim 1, wherein splitting the utterance into the two or more parts comprises separating and reformatting the two or more parts according to one or more sentence splitting rules.

8. The method of claim 7, wherein reformatting the two or more parts comprises:
determining, based on the one or more sentence splitting rules, that a portion of a second part of the two or more parts is relevant to the first part; and
replicating the portion of the second part in the first part.

9. The method of claim 1, further comprising:
determining, by the computer system, an order in which the two or more parts should be handled, wherein the first part is communicated to the first chatbot according to the determined order.

10. The method of claim 9, wherein determining the order in which the two or more parts should be handled comprises analyzing the information on the sentence structure of the utterance to determine whether the utterance contains markers that indicate precedence.

11. A system comprising:
one or more processors; and
a memory coupled to the one or more processors, the memory storing a plurality of instructions that, when executed by the one or more processors, causes the one or more processors to perform processing comprising:
receiving an utterance, wherein the utterance comprises text forming at least a sentence fragment;
parsing the utterance, the parsing producing information on a sentence structure of the utterance;
identifying one or more rules that are applicable to the sentence structure of the utterance;
detecting, using the one or more rules, that the utterance comprises two or more parts which represent separate user intents;
splitting the utterance into the two or more parts;
analyzing the two or more parts separately, wherein the analyzing comprises identifying a first chatbot for handling a first part of the two or more parts; and
communicating the first part to the first chatbot.

12. The system of claim 11, wherein the plurality of instructions further causes the one or more processors to perform processing comprising:
determining that a user intent represented in the first part corresponds to a bot intent with which the first chatbot has been configured, wherein the bot intent represents a task that the first chatbot is capable of performing.

13. The system of claim 12, wherein the plurality of instructions further causes the one or more processors to perform processing comprising:
determining, as part of executing the first chatbot, a response to the first part, wherein the response is associated with the bot intent and comprises an action to be performed by the first chatbot or a message for the user.

14. The system of claim 12, wherein determining that the user intent represented by the first part corresponds to the bot intent comprises analyzing the first part using a classifier that has been trained on a set of one or more example utterances provided for the bot intent.

15. The system of claim 11, wherein detecting that the utterance comprises two or more parts which represent separate user intents comprises determining, using the information on the sentence structure of the utterance, that the utterance matches a sentence pattern specified by the one or more rules.

16. The system of claim 15, wherein the information on the sentence structure of the utterance includes part of speech (POS) tags for the utterance and information on dependencies between linguistic units in the utterance, and wherein the sentence pattern is specified in terms of POS tags and dependencies between linguistic units.

17. The system of claim 11, wherein splitting the utterance into the two or more parts comprises separating and reformatting the two or more parts according to one or more sentence splitting rules.

18. The system of claim 17, wherein reformatting the two or more parts comprises:
determining, based on the one or more sentence splitting rules, that a portion of a second part of the two or more parts is relevant to the first part; and
replicating the portion of the second part in the first part.

19. The system of claim 11, wherein the plurality of instructions further causes the one or more processors to perform processing comprising:
determining an order in which the two or more parts should be handled, wherein the first part is communicated to the first chatbot according to the determined order.

20. A non-transitory computer-readable memory storing a plurality of instructions that, when executed by one or more processors, causes the one or more processors to perform processing comprising:
receiving an utterance, wherein the utterance comprises text forming at least a sentence fragment;
parsing the utterance, the parsing producing information on a sentence structure of the utterance;
identifying one or more rules that are applicable to the sentence structure of the utterance;
detecting, using the one or more rules, that the utterance comprises two or more parts which represent separate user intents;
splitting the utterance into the two or more parts;
analyzing the two or more parts separately, wherein the analyzing comprises identifying a first chatbot for handling a first part of the two or more parts; and
communicating the first part to the first chatbot.

* * * * *